United States Patent [19]

Mayfield

[11] Patent Number: 4,864,883

[45] Date of Patent: Sep. 12, 1989

[54] RECIRCULATING BALL NUT FOR POWER SCREW SYSTEM

[75] Inventor: Ralph W. Mayfield, Cincinnati, Ohio

[73] Assignee: Cincinnati Milacron Inc., Cincinnati, Ohio

[21] Appl. No.: 142,571

[22] Filed: Jan. 11, 1988

[51] Int. Cl.⁴ .............................................. F16H 1/10
[52] U.S. Cl. ................................... 74/424.8 R; 74/459
[58] Field of Search ............................ 74/459, 424.8 R

[56] References Cited

U.S. PATENT DOCUMENTS

| | | | |
|---|---|---|---|
| 676,044 | 6/1901 | Locke | 74/459 |
| 969,215 | 9/1910 | Starbuck | 74/459 |
| 3,244,022 | 4/1966 | Wysong, Jr. | 74/424.8 |
| 3,826,153 | 7/1974 | Sheppard | 74/459 |
| 4,074,585 | 2/1978 | Richaud et al. | 74/424.8 |
| 4,211,125 | 7/1980 | Benton | 74/424.8 |
| 4,612,817 | 9/1986 | Neff | 74/424.8 |
| 4,677,869 | 7/1987 | Mayfield | 74/424.8 |

FOREIGN PATENT DOCUMENTS

| | | | |
|---|---|---|---|
| 367599 | 11/1906 | France | 74/459 |
| 143594 | 6/1920 | United Kingdom | 74/459 |
| 559407 | 2/1944 | United Kingdom | 74/459 |
| 1228279 | 4/1971 | United Kingdom | 74/459 |

*Primary Examiner*—Rodney H. Bonck
*Assistant Examiner*—Scott Anchell
*Attorney, Agent, or Firm*—Thomas M. Farrell; Frank C. Leach

[57] ABSTRACT

A recirculating ball nut includes an inner hollow element surrounding a ball screw extending therethrough with the inner hollow element and the ball screw having cooperating helical grooves with balls therein. The ball nut has an outer hollow element surrounding the inner hollow element and secured thereto. The outer hollow element has the same number of helical grooves, which extend for less than a revolution, on its inner surface as the inner hollow element. Each helical groove in the outer hollow element has its ends communicate through ball connectors with one of the helical grooves in the inner surface of the inner hollow element and the cooperating helical groove in the ball screw at two spaced portions to allow the balls to recirculate. Each ball connector is disposed within a slot in an end of the inner hollow element and rests on an arcuate portion of an inner surface of the outer hollow element. This occurs without requiring the balls to be removed and returned at a lead of the helical groove in the inner surface of the inner hollow element or a multiple thereof.

7 Claims, 4 Drawing Sheets

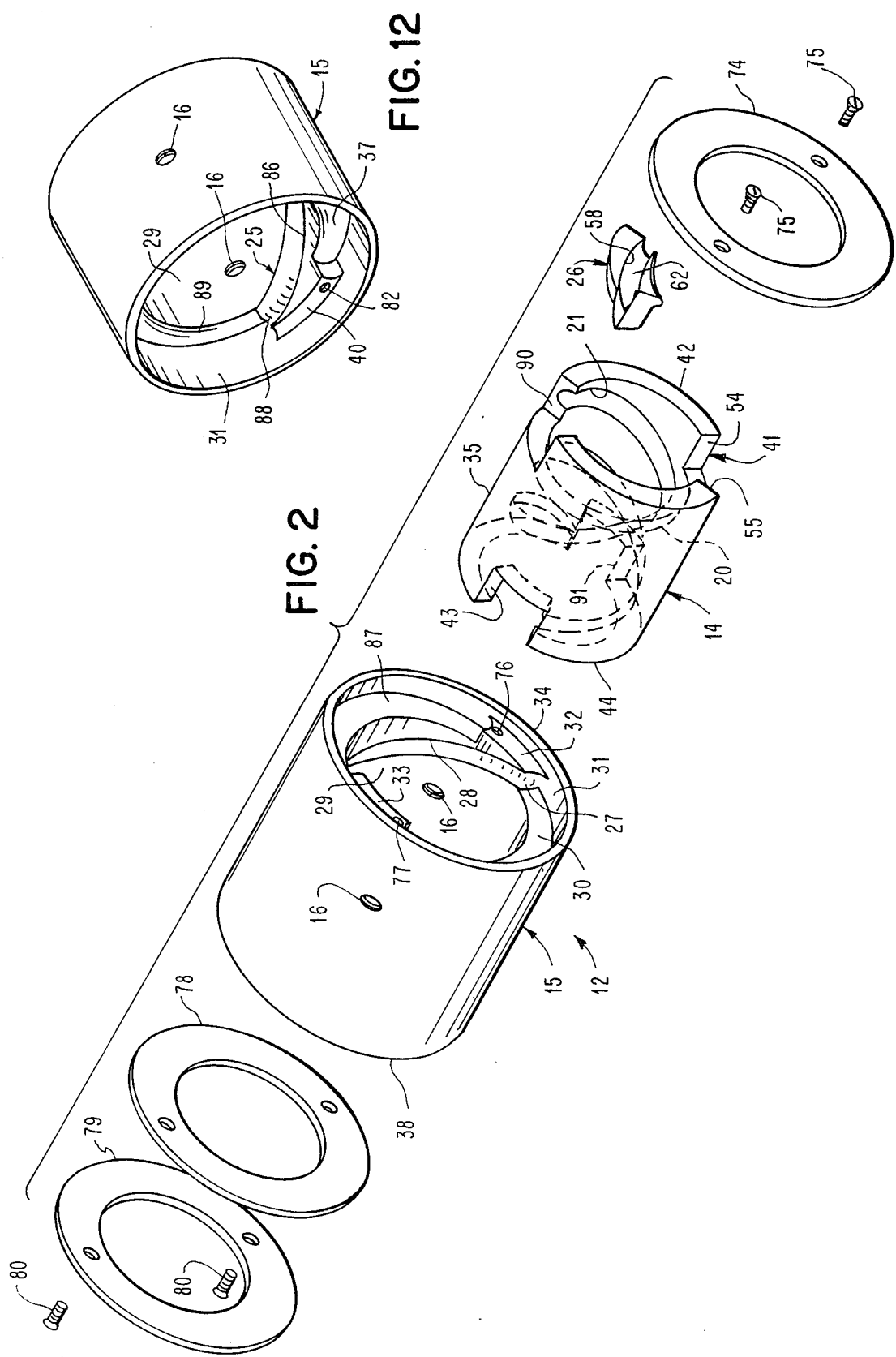

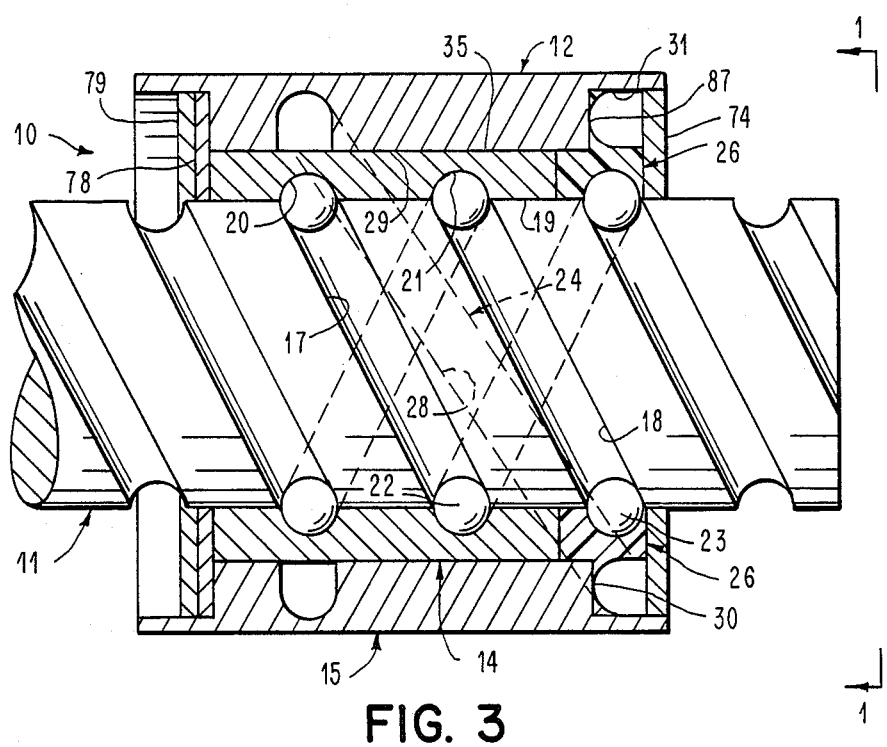
FIG. 3
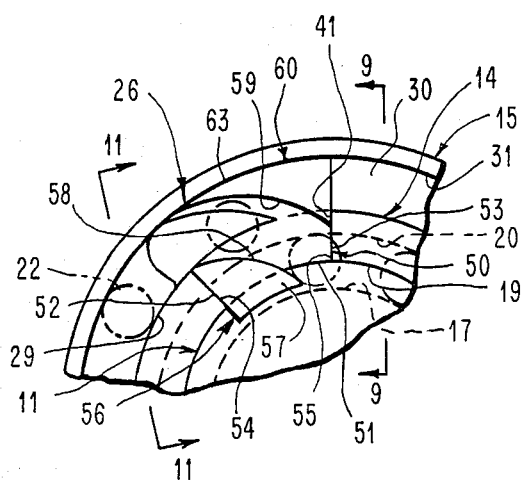
FIG. 8
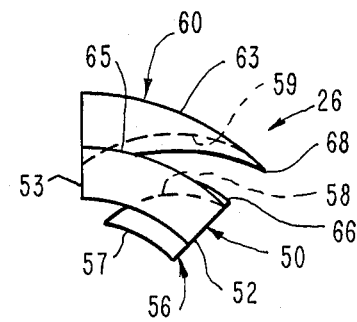
FIG. 10
FIG. 13
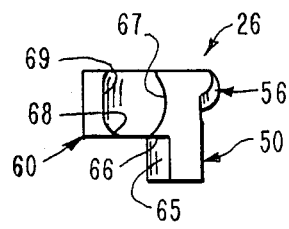
FIG. 11
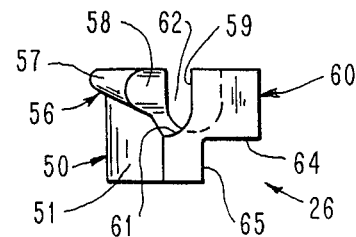
FIG. 9

RECIRCULATING BALL NUT FOR POWER SCREW SYSTEM

This invention relates to a recirculating ball nut for use with a ball screw and, more particularly, to a recirculating ball nut having the balls removed from the ball track and returned thereto at different locations on the ball screw.

In a power screw system having a ball screw extending through a ball nut with balls disposed in one or more cooperating helical grooves or tracks in the outer surface of the ball screw and the inner surface of the ball nut, rotating one of the ball screw and the ball nut produces axial advancement of the other. An endless ball circuit must be provided to recirculate the balls.

One means for recirculating the balls is to provide an axial bore in the ball nut for each endless ball circuit. Thus, with a double start ball screw which has two separate helical grooves or tracks, there are two axial bores in the ball nut. U.S. Pat. No. 4,074,585 to Richaud et al and U.S. Pat. No. 4,211,125 to Benton disclose examples of an axial bore recirculating path for the balls.

When recirculating the balls through an axial bore in the ball nut, the balls must be removed from the helical groove in the ball screw and returned to another portion of the helical groove in the ball screw at the same location. Thus, the length of the ball path in the ball nut must be such that the balls travel only the lead of the helical groove in the ball screw or a multiple of the lead in the endless ball circuit from the time that the balls are removed from the helical groove in the ball screw until the balls are returned thereto. This arrangement results in the ball nut having its length controlled by the lead of the helical groove in the ball screw. Thus, an increase in the lead of the helical groove in the ball screw increases the length of the ball nut.

One arrangement for avoiding the ball nut recirculating path having to be equal to the lead of the helical groove in the ball screw or a multiple thereof is to utilize an external ball return. Examples of external ball return arrangements are found in U.S. Pat. No. 3,244,022 to Wysong, Jr. and U.S. Pat. No. 4,612,817 to Neff. The external ball return enables the balls to be picked up and returned at other than the same position on the helical groove of the ball screw.

However, the external ball return arrangement has some type of an external tube. The external tube usually protrudes beyond the ball nut as in the aforesaid Wysong, Jr. patent, for example, or the ball nut must be much larger in diameter as in the aforesaid Neff patent, for example. The external ball return tube also is flimsy.

The ball nut of the present invention overcomes the foregoing problems of both the internal and external ball recirculation arrangements while having the advantage of the external ball return arrangement of not having to return the balls to the same location on the helical groove of the ball screw from which the balls were removed. The present invention accomplishes this through forming the ball nut of an inner hollow element, which surrounds the ball screw, and an outer hollow element surrounding the inner hollow element and forming ball recirculating means, which is preferably a helical groove, in one of the adjacent surfaces of the inner and outer hollow elements to return the balls to any portion of the helical groove in the ball screw. The ball nut does not have to extend for more than one revolution of the helical groove in the ball nut.

The ball nut of the present invention has particular utility with a ball screw having a high helical groove since this creates a fast motion. This high helical groove has a high ratio of axial movement in one revolution so that it is desired for the ball nut to have a minimum length.

Conservation of the length of the ball nut is particularly important when the ball nut is advancing axially relative to the ball screw during relative rotation between the ball nut and the ball screw. This is because the inertia of the ball nut during its rotation as it is axially advanced increases with its size so that an increased length of the ball nut creats an increased inertia.

An object of this invention is to provide a ball recirculation circuit for a high speed ball screw.

Another object of this invention is to provide a recirculation ball nut in which the balls do not have to be returned to a ball track at a lead of a helical groove in a ball screw or a multiple thereof.

Other objects of this invention will be readily perceived from the following description, claims, and drawings.

The attached drawings illustrate a preferred embodiment of the invention, in which:

FIG. 2 is an exploded perspective view of a ball nut of the present invention;

FIG. 3 is a longitudinal sectional view of the power screw system of FIG. 1;

FIG. 8 is a top plan view of a ball connector used in directing the balls betwen helical grooves in an inner hollow element of the ball nut and the ball screw and a helical groove in an outer hollow element of the ball nut and showing portions of the helical grooves and balls cooperating with the ball connector;

FIG. 9 is an end elevational view of the ball connector of FIG. 8 and taken along line 9—9 of FIG. 8;

FIG. 10 is a bottom plan view of the ball connector of FIG. 8;

FIG. 11 is an end elevational view of the ball connector of FIG. 8 and taken along line 11—11 of FIG. 8;

FIG. 12 is a perspective view of one end of the outer hollow element of the ball nut; and FIG. 13 is a fragmentary elevational view of a portion of the ball connector of FIG. 8.

Figure 1:
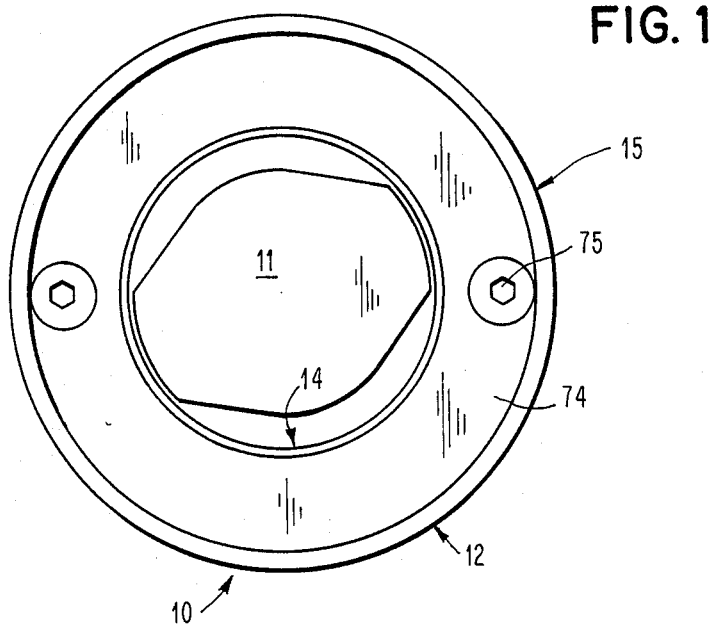
FIG. 1 is an end elevational view of a power screw system having a ball screw extending through a ball nut of the present invention and taken along line 1—1 of FIG. 3.

Referring to the drawings and particularly to FIG. 1, there is shown a power screw system 10 including a ball screw 11 extending through a ball nut 12. One of the ball screw 11 and the ball nut 12 is fixed while the other moves axially along the axial centerline of the ball screw 11 during relative rotation therebetween.

The ball screw 11 is driven by suitable motive means (not shown) in the well-known manner so that the ball screw 11 is rotated. With the ball screw 11 fixed against axial advancement, rotation of the ball screw 11 relative to the ball nut 12 advances the ball nut 12 axially along the centerline of the ball screw 11.

The ball nut 12 includes an inner hollow element 14 (see FIG. 3), which surrounds the ball screw 11, and an outer hollow element 15, which surrounds the inner hollow element 14. The inner hollow element 14 and the outer hollow element 15 are secured to each other by set screws (not shown) extending through diametrically disposed threaded passages 16 (see FIGS. 2–5 and 12) in the outer hollow element 15.

The ball screw 11 (see FIG. 3) is a double start ball screw so that it has two separate helical grooves or tracks 17 and 18 formed therein. The inner hollow element 14 of the ball nut 12 has its inner surface 19 formed with helical grooves 20 and 21 therein for cooperation with the helical grooves 17 and 18, respectively, in the ball screw 11.

A plurality of balls 22 is disposed in the helical grooves 17 and 20 to provide a driving relation therebetween during relative rotation therebetween. A plurality of balls 23 is disposed in the helical grooves 18 and 21 to provide a driving relation therebetween during relative rotation therebetween.

The balls 22 must be returned in an endless ball circuit 24 from one portion of the helical groove 17 in the ball screw 11 and the cooperating helical groove 20 in the inner hollow element 14 to another portion of the helical groove 17 in the ball screw 11 and the cooperating helical groove 20 in the inner hollow element 14. Likewise, the balls 23 must be similarly returned in an endless ball circuit 25 (see FIG. 7) between similar portions of the helical groove 18 (see FIG. 3) in the ball screw 11 and the cooperating helical groove 21 in the inner hollow element 14.

Figure 7:
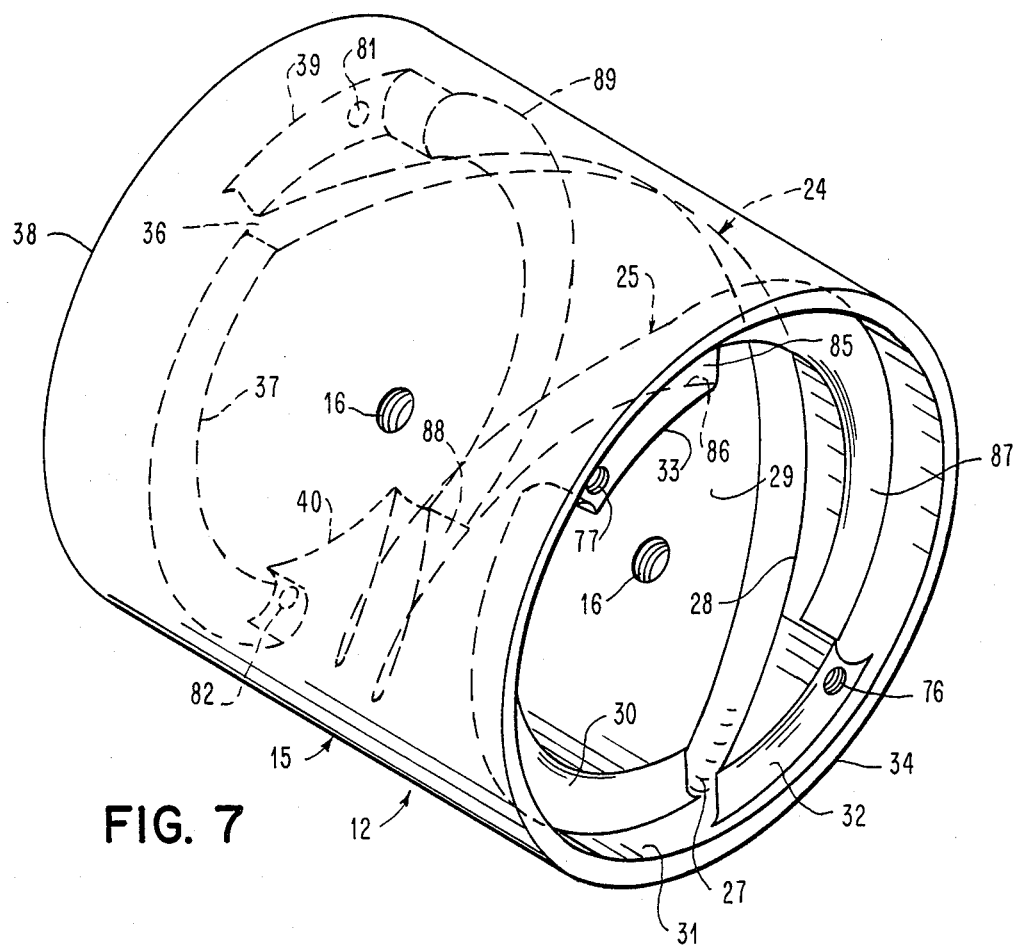
FIG. 7 is an enlarged perspective view of the outer hollow element of the ball nut.
Figure 5:
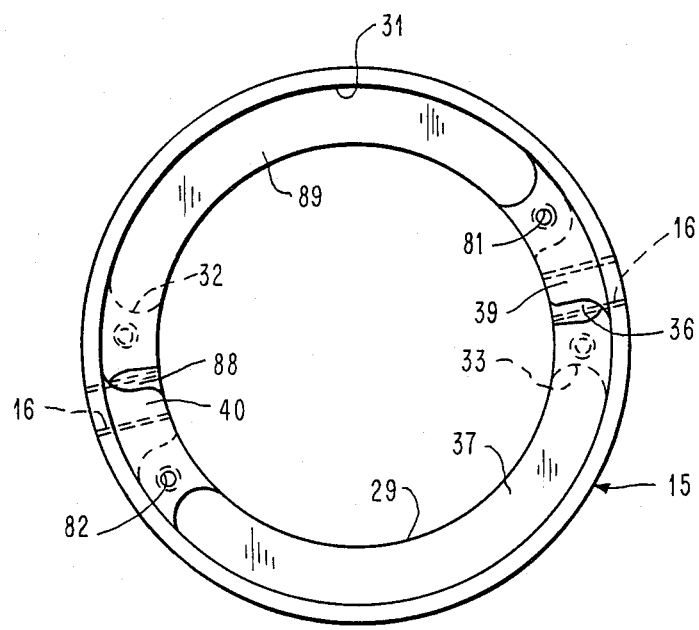
FIG. 5 is an end elevational view of the other end of the outer hollow element of the ball nut.

The endless ball circuit 24 includes a ball connector 26 for transferring the balls 22 from a portion of the helical groove 17 in the ball screw 11 and the cooperating helical groove 20 in the inner surface 19 of the inner hollow element 14 to one end 27 (see FIG. 2) of a helical groove 28 in a first inner surface 29 of the outer hollow element 15 of the ball nut 12. As shown in FIG. 7, the helical groove 28 extends for slightly more than 180° of the first inner surface 29 of the outer hollow element 15.

Figure 4:
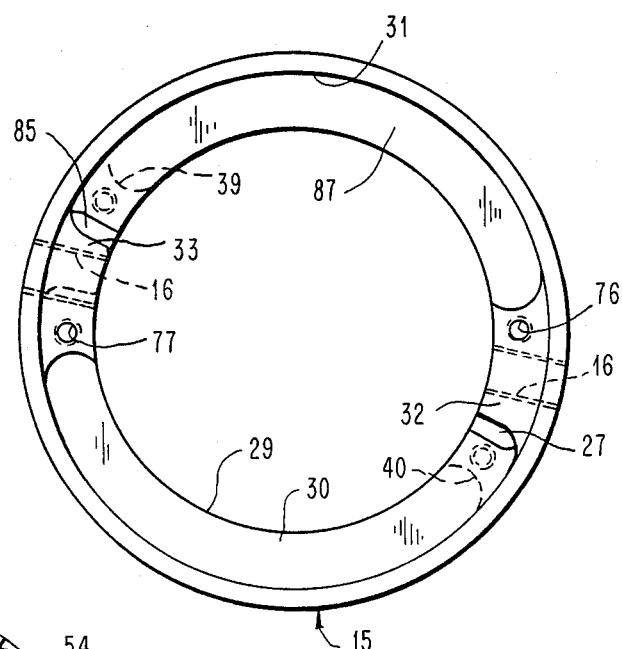
FIG. 4 is an end elevational view of one end of an outer hollow element of the ball nut.

The ball connector 26 (see FIG. 2) rests on an arcuate portion 30, which extends from a second inner surface 31 of the outer hollow element 15 of the ball nut 12. As shown in FIG. 4, the arcuate portion 30 extends between two raised portions 32 and 33, which are raised relative to the arcuate portion 30, on the second inner surface 31 of the outer hollow element 15 adjacent its end 34 (see FIG. 2). As shown in FIG. 4, the first inner surface 29 has a smaller diameter than the second inner surface 31 and has a tight fit with an outer surface 35 (see FIG. 6) of the inner hollow element 14.

The helical groove 28 (see FIG. 7) has its other end 36 communicating through another of the ball connectors 26 (see FIG. 2) with another portion of the helical groove 27 (see FIG. 3) in the ball screw 11 and the cooperating helical groove 20 in the inner surface 19 of the inner hollow element 14. The ball connector 26, which transfers the balls 22 between the end 36 (see FIG. 7) of the helical groove 28 and another portion of the helical groove 17 (see FIG. 3) in the ball screw 11 and the cooperating helical groove 20 in the inner surface 19 of the inner hollow element 14, rests on an arcuate portion 37 (see FIG. 5), which extends from the second inner surface 31 of the outer hollow element 15 adjacent the other end 38 (see FIG. 2).

The arcuate portion 37 (see FIG. 5) extends from a raised portion 39 on the second inner surface 31 of the outer hollow element 15 to a raised portion 40 on the second inner surface 31 of the outer hollow element 15. The ball connector 26 (see FIG. 2) is disposed adjacent the raised portion 39 (see FIG. 5).

The ball connector 26 (see FIG. 2), which is supported by the arcuate portion 30, also is disposed within a slot 41 in an end 42 of the inner hollow element 14. The ball connector 26, which is supported on the arcuate portion 37 (see FIG. 5) of the outer hollow element 15, is disposed within a slot 43 (see FIG. 2) in an end 44 of the inner hollow element 14. Each of the ball connectors 26 is disposed within the slots 41 and 43 in the same manner so that the disposition of the bell connector 26 in the slot 41 will be described but it would be the same for the slot 43.

The ball connector 26 (see FIG. 8) includes a first portion 50 having an inner surface 51 formed with the same radius of curvature as the inner surface 19 of the inner hollow element 14. The first portion 50 has its end surfaces 52 and 53 formed on the same angle as the slot 41 in the inner hollow element 14 so that the end surfaces 52 and 53 will abut end walls 54 and 55, respectively, of the slot 41 whereby the inner surface 51 of the first portion 50 will constitute a smooth continuation of the inner surface 19 of the inner hollow element 14.

The first portion 50 has a second portion 56 integral therewith and extending upwardly therefrom. The second portion 56 has a curved part 57 extending into the helical groove 17 in the ball screw 11. The second portion 56 has a curved surface 58, which is formed as a continuation of the helical groove 17 in the ball screw 11, to aid in guiding the balls 22, which are diverted by the curved part 57 between the curved surface 58 of the second portion 56 and a curved surface 59 of a third portion 60 of the ball connector 26.

The curved surface 59 of the third portion 60 is substantially concentric to the curved surface 58 of the second portion 56 so as to be equidistant therefrom. The curved surface 59 of the third portion 60 is a continuation of the helical groove 20 in the inner surface 19 of the inner hollow element 14. Thus, the balls 22 may easily roll into the ball connector 26.

The first portion 50 (see FIG. 9) of the ball connector 26 has a curved surface 61 to support the balls 22 (see FIG. 8) as they ride between the curved surface 58 (see FIG. 9) of the second portion 56 and the curved surface 59 of the third portion 60 of the ball connector 26. Thus, the surfaces 58, 59, and 61 to cooperate to form a ball passage 62 in the ball connector 26.

The third portion 60 (see FIG. 8) of the ball connector 26 has a curved surface 63 abutting the second inner surface 31 of the outer hollow element 15 and a flat surface 64 (see FIG. 9) resting on the arcuate portion 30 (see FIG. 4) of the outer hollow element 15. The first portion 50 (see FIG. 10) has a curved surface 65, which abuts the first inner surface 19 (see FIG. 4) of the outer hollow element 15 just beneath the arcuate portion 30.

The ball connector 26 (see FIG. 11) has a ledge 66 resting on the arcuate portion 30 (see FIG. 2) of the outer ball element 15 adjacent the end 27 of the helical groove 28. The second portion 56 (see FIG. 11) of the ball connector 26 has a curved surface 67 at the end of the curved surface 58 (see FIG. 8) to cooperate with the end 27 (see FIG. 2) of the helical groove 28 in the first inner surface 29 of the outer hollow element 15. This aids in allowing the balls 22 (see FIG. 3) to roll smoothly into the helical groove 28 (see FIG. 2) in the first inner surface 29 of the outer hollow element 15. The third portion 60 (see FIG. 11) of the ball connector 26 has its end 68 formed with a curved surface 69 (see FIG. 13) to cooperate with the end 27 (see FIG. 2) of the helical groove 28 in the first inner surface 29 of the outer hollow element 15.

Accordingly, when a washer 74 is positioned within the outer hollow element 15 and secured to the raised portions 32 and 33 (see FIG. 4) by screws 75 (see FIG. 2) extending into threaded holes 76 (see FIG. 4) and 77 in the raised portions 32 and 33, respectively, the ball connector 26 (see FIG. 2) is held in the desired position. The washer 74 is only secured after the inner hollow element 14 is secured to the outer hollow element 15 by the set screws. The washer 74 cooperates with the ball connector 26 to close the ball passage 62 formed by the surfaces 58 (see FIG. 9), 59, and 61.

The ball connector 26, which is disposed in the slot 43 (see FIG. 2) in the end 44 of the inner hollow element 14, is similarly retained in position on the arcuate portion 37 (see FIG. 5) by a spacer 78 (see FIG. 2) and a washer 79 being secured to the raised portions 39 (see FIG. 5) and 40 on the second inner surface 31 of the outer hollow element 15 by screws 80 (see FIG. 2) extending into threaded holes 81 (see FIG. 5) and 82 in the raised portions 39 and 40, respectively.

The endless ball circuit 25 (see FIG. 7) includes the ball connector 26 (see FIG. 3) for transferring the balls 23 from the helical groove 18 in the ball screw 11 and the cooperating helical groove 21 in the inner surface 19 of the inner hollow element 14 to one end 85 (see FIG. 7) of a helical groove 86 in the first inner surface 29 of the outer hollow element 15 of the ball nut 12. The helical groove 86 extends for slightly more than 180° of the first inner surface 29 of the outer hollow element 15.

The ball connector 26 (see FIG. 2) rests on an arcuate portion 87 (see FIG. 4), which extends from the second inner surface 31 of the outer hollow element 15 of the ball nut 12. the arcuate portion 87 extends between the two raised portions 32 and 33 on the second inner surface 31 of the outer hollow element 15 adjacent the end 34 (see FIG. 2).

The helical groove 86 (see FIG. 12) has its other end 88 communicating through another of the ball connectors 26 (see FIG. 8) with another portion of the helical groove 18 (see FIG. 3) in the ball screw 11 and the cooperating helical groove 21 in the inner surface 19 of the inner hollow element 14. The ball connector 26, which transfers the balls 23 between the end 88 (see FIG. 12) of the helical groove 86 and another portion of the helical groove 18 (see FIG. 3) in the ball screw 11 and the cooperating helical groove 21 in the inner surface 19 of the inner hollow element 14, rests on an arcuate portion 89 (see FIG. 5), which extends from the second inner surface 31 of the outer hollow element 15 adjacent the other end 38 (see FIG. 2).

The arcuate portion 89 (see FIG. 5) extends from the raised portion 39 on the second inner surface 31 of the outer hollow element 15 to the raised portion 40 on the second inner surface 31 of the outer hollow element 15. The ball connector 26 (see FIG. 2) is disposed adjacent the raised portion (see FIG. 5).

The ball connector 26 (see FIG. 2), which is supported by the arcuate portion 87 adjacent the raised portion 33, also is disposed within a slot 90 in the end 42 of the inner hollow element 14. The ball connector 26, which is supported on the arcuate portion 89 (see FIG. 5) adjacent the raised portion 40, is disposed within a slot 91 (see FIG. 2) in the end 44 of the inner hollow element 14. Each of the ball connectors 26 is disposed within the slots 90 and 91 in the same manner as the ball connector 26 is disposed in the slot 41 as has been previously described.

Figure 6:
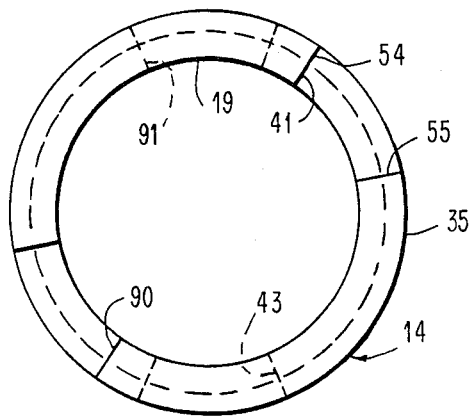
FIG. 6 is an end elevational view of one end of an inner hollow element of the ball nut.

The slots 41 and 90 are disposed diametrically opposite from each other as shown in FIG. 6. The slots 43 and 91 are diametrically disposed to each other as shown in FIG. 6. The slots 41 and 43 are less than 180° from each other. The slots 90 and 91 are less than 180° from each other and have the same spacing from each other as the slots 41 and 43.

When the washer 74 (see FIG. 2) is positioned within the outer hollow element 15 and secured to the raised portions 32 and 33 by the screws 75, the washer 74 holds the ball connector 26, which is supported on the arcuate portion 87 adjacent the raised portion 33, in the desired position and the washer 74 cooperates with the ball connector 26 to close the ball passage 62 therein formed by the surfaces 58, 59 (see FIG. 9), and 61 between the end 85 (see FIG. 7) of the helical groove 86 and the arcuate portion 87.

When the spacer 78 (see FIG. 2) and the washer 79 are secured to the raised portions 39 (see FIG. 5) and 40 by the screws 80 (see FIG. 2), the spacer 78 holds the ball connector 26, which is supported on the arcuate portion 89 (see FIG. 5) adjacent the raised portion 40, in the desired position. The spacer 78 (see FIG. 2) cooperates with the ball connector 26 to close the ball passage 62 therein formed by the surfaces 58, 59 (see FIG. 9), and 61 between the end 88 (see FIG. 12) of the helical groove 86 and the arcuate portion 89.

While the ball screw 11 (see FIG. 3) has been shown and described as a double start ball screw, it should be understood that the ball screw 11 may be a single start ball srew or have more than two of the helical grooves 17 and 18. The ball nut 12 will have the same number of the helical grooves 28 (see FIG. 7) and 86 in the first inner surface 29 of the outer hollow element 15 as the ball screw 11 (see FIG. 3) has. Thus, if the ball screw 11 is a single start ball screw, then the outer hollow element 15 would have only one of the helical grooves 28 (see FIG. 7) and 86.

None of the helical grooves in the first inner surface 29 of the outer hollow element 15 will extend for a complete revolution. It is preferable that they extend for only slightly more than 180°. If the ball screw 11 (see FIG. 3) has three of the helical grooves rather than the two helical grooves 17 and 18, for example, then the three helical grooves in the first inner surface 29 of the outer hollow element 15 would be formed so that each terminates from the others an equal angular amount. For example, if the first inner surface 29 of the outer hollow element 15 has three helical grooves therein, each would extend for less than one-half of a revolution.

While the ball screw 11 has been shown as being utilized with only the ball nut 12, it should be understood that there could be two ball nuts such as a flanged ball nut and a traveling ball nut connected to each other in the manner shown in U.S. Pat. No. 4,677,869 issued to me. My aforesaid patent is incorporated by reference herein. Thus, when the ball nut includes the flanged ball nut and the traveling ball nut, each of the flanged ball nut and the traveling ball nut would have the same arrangement of both an inner hollow element and an outer hollow element in the same manner as shown and described for the ball nut 12.

While the outer hollow element 15 of the ball nut 12 has been shown and described as having the helical grooves 28 and 86 (see FIG. 12) formed in the first inner surface 29 and the arcuate portions 30 (see FIG. 4), 37 (see FIG. 5), 87 (see FIG. 4), and 89 (see FIG. 5) have been shown as being supported by the second inner surface 31 of the outer hollow element 15, it should be understood that the inner hollow element 14 (see FIG. 2) could have the outer surface 35 formed with the helical grooves 28 and 86 (see FIG. 12). This would require the arcuate portions 30 (see FIG. 4), 37 (see FIG. 5), 87 (see FIG. 4) and 89 (see FIG. 5) to also be formed on the outer surface 35 of the inner hollow element 14. This would necessitate the ball connectors 26 being formed in a different manner to smoothly transfer the balls 22 (see FIG. 3) and 23 between the helical grooves 28 and 86 (see FIG. 12), respectively, and the helical grooves 17 (see FIG. 3) and 18 in the ball screw 11, respectively, and the cooperating helical grooves 20 and 21 in the inner hollow element 14.

Accordingly, either the inner hollow element 14 or the outer hollow element 15 can have the recirculating ball arrangement. It is only necessary that it be on the surface of the inner hollow element 14 or the outer hollow element 15 adjacent the other of the inner hollow element 14 and the outer hollow element 15.

It should be understood that the balls 22 and 23 may be transferred in either direction along the helical grooves 28 and 86 (see FIG. 12), respectively. Thus, the description of the balls 22 (see FIG. 3) and 23 moving in one direction is merely one example as the balls 22 and 23 can move in the opposite direction when the ball screw 11 and the ball nut 12 have relative rotation in the opposite direction.

While the recirculation of the balls 22 has been shown and described as being by the helical groove 28 and the recirculation of the balls 23 has been shown and described as being by the helical groove 86 (see FIG. 12), it should be understood that the ball recirculating means does not have to be a helical groove. Any other suitable recirculating path for the balls 22 (see FIG. 3) and 23 may be utilized.

The length of the ball nut 12 is determined solely by the load capacity and the desired feed rate. There is no requirement of the ball nut 12 having a length corresponding to a multiple of a revolution of the helical grooves 17 and 18 in the ball screw 11 in order to have a satisfactory ball recirculation arrangement. The ball connectors 26 may be deemed to be equivalent to a revolution of each of the helical grooves 17 and 18 in the ball screw 11.

An advantage of this invention is that no external tube is required to recirculate the balls between two portions of a helical groove in a ball screw without returning to the same position at a lead of the helical groove in the ball screw or a multiple thereof. Another advantage of this invention is that the ball return distance is minimized. A further advantage of this invention is that it is not necessary for the ball return path to extend for a full revolution of the helical groove in the inner surface of the ball nut. Still another advantage of this invention is that it does not require the balls to be removed and inserted at the same location on the ball screw.

For proposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A power screw system including:
   a ball screw having at least one helical groove in its outer surface;
   and a ball nut including:
   an inner hollow element disposed in surrounding relation to said ball screw;
   said inner hollow element having helical grooves in its inner surface equal in number to said helical grooves in said outer surface of said ball screw;
   each of said helical grooves in said inner surface of said inner hollow element cooperating with a corresponding one of said helical grooves in said outer surface of said ball screw;
   a plurality of balls disposed in each of said helical grooves in said inner surface of said inner hollow element and a corresponding one of said helical grooves in said outer surface of said ball screw;
   an outer hollow element disposed in surrounding relation to said inner hollow element and secured thereto;
   said outer hollow element having an inner surface having ball recirculating means therein equal in number to said helical grooves in said outer surface of said ball screw;
   communicating means, separate from each of said inner hollow element and said outer hollow element, for continuously communicating each end of each of said ball recirculating means in said outer hollow element with spaced portions of one of said helical grooves in said outer surface of said ball screw and a corresponding one of said helical grooves in said inner surface of said inner hollow element to recirculate balls in said one helical groove in said outer surface of said ball screw and the corresponding one of said helical grooves in said inner surface of said inner hollow element from one portion thereof within said ball nut to another portion thereof within said ball nut;
   and said communicating means for each of said ball recirculating means in said outer hollow element including:
   first transfer means having one end continuously communicating with one end of said ball recirculating means in said outer hollow element and its other end continuously communicating with a portion of said helical groove in said inner surface of said inner hollow element and said helical groove in said outer surface of said ball screw cooperating therewith to allow said balls to move therebetween solely through said first transfer means, said first transfer means being supported on said outer hollow element;
   and second transfer means having one end continuously communicating with the other end of said ball recirculating means in said outer hollow element and its other end continuously communicating with another portion of said helical groove in said inner surface of said inner hollow element and said helical groove in said outer surface of said ball screw cooperating therewith to allow said balls to move therebetween solely through said second transfer means, said second transfer means being supported on said outer hollow element.

2. The power screw system according to claim 1 in which:
said outer hollow element has third means to support said first transfer means;
and said outer hollow element has fourth means to support said second transfer means.

3. The power screw system according to claim 2 in which said inner hollow element includes means for receiving each of said first transfer means and said second transfer means.

4. The power screw system according to claim 3 in which:
said receiving means in said inner hollow element for said first transfer means is a slot in one end of said inner hollow element;
and said receiving means in said inner hollow element for said second transfer means is a slot in the other end of said inner hollow element.

5. The power screw system according to claim 4 in which each of said first transfer means and said second transfer means includes means extending into said helical groove in said outer surface of said ball screw to block said helical groove in said outer surface of said ball screw when said balls are to be removed therefrom for recirculation.

6. The power screw system according to claim 1 in which each of said first transfer means and said second transfer means includes means extending into said helical groove in said outer surface of said ball screw to block said helical groove in said outer surface of said ball screw when said balls are to be removed therefrom for recirculation.

7. The power screw system according to claim 1 in which:
said first transfer means of said communicating means for each of said ball recirculating means in said outer hollow element has passage means therein through which said balls move solely between the one end of said ball recirculating means in said outer hollow element and a portion of said helical groove in said inner surface of said inner hollow element and said helical groove in said outer surface of said ball screw cooperating therewith;
and said second transfer means of said communicating means for each of said ball recirculating means in said outer hollow element has passage means therein through which said balls move solely between the other end of said ball recirculating means in said outer hollow element and another portion of said helical groove in said inner surface of said inner hollow element and said helical groove in said outer surface of said ball screw cooperating therewith.

* * * * *